United States Patent [19]

Bauer et al.

[11] 4,304,205
[45] Dec. 8, 1981

[54] INJECTION TIMING DEVICE FOR INTERNAL COMBUSTION ENGINE

[75] Inventors: Otto Bauer, Munich; Leonard Eberl, Unterschleissheim; Gerhard Geyer, Munich; Max Straubel, Stuttgart, all of Fed. Rep. of Germany

[73] Assignee: Robert Bosch GmbH, Stuttgart, Fed. Rep. of Germany

[21] Appl. No.: 46,408

[22] Filed: Jun. 7, 1979

[30] Foreign Application Priority Data

Jun. 19, 1978 [DE] Fed. Rep. of Germany ....... 2826801

[51] Int. Cl.³ .............................................. F02M 59/20
[52] U.S. Cl. ................................... 123/502; 123/501; 64/25
[58] Field of Search ..... 64/25; 123/139 AP, 139 AQ, 123/140 FG, 501, 502, 385–388

[56] References Cited
U.S. PATENT DOCUMENTS 3,774,411 11/1973 Phillips et al. .......................... 64/25
4,132,202 1/1979 Nakayama et al. ..................... 64/25

FOREIGN PATENT DOCUMENTS 2231593 1/1974 Fed. Rep. of Germany .......... 64/25
1268366 9/1960 France .......................... 123/139 AQ
816498 7/1959 United Kingdom ..................... 64/25

*Primary Examiner*—Ira S. Lazarus
*Assistant Examiner*—Magdalen Moy
*Attorney, Agent, or Firm*—Edwin E. Greigg

[57] ABSTRACT

An injection timing device is proposed for internal combustion engines, by means of which the mutual rotary position of the output shaft with respect to the input shaft can be varied at least in dependence on the speed. The timing device comprises at least one pair of eccentrics which serve as the adjusting gear system and comprises an adjusting eccentric and a compensating eccentric, this pair of eccentrics being supported in a bearing member connected to one of the shafts, the adjusting eccentric of this pair also being coupled by means of a transmission member with a hydraulically operable servo piston. By a positional change of the servo piston effected by the hydraulic medium, the adjusting eccentric can be rotated to change the instant of injection.

10 Claims, 10 Drawing Figures

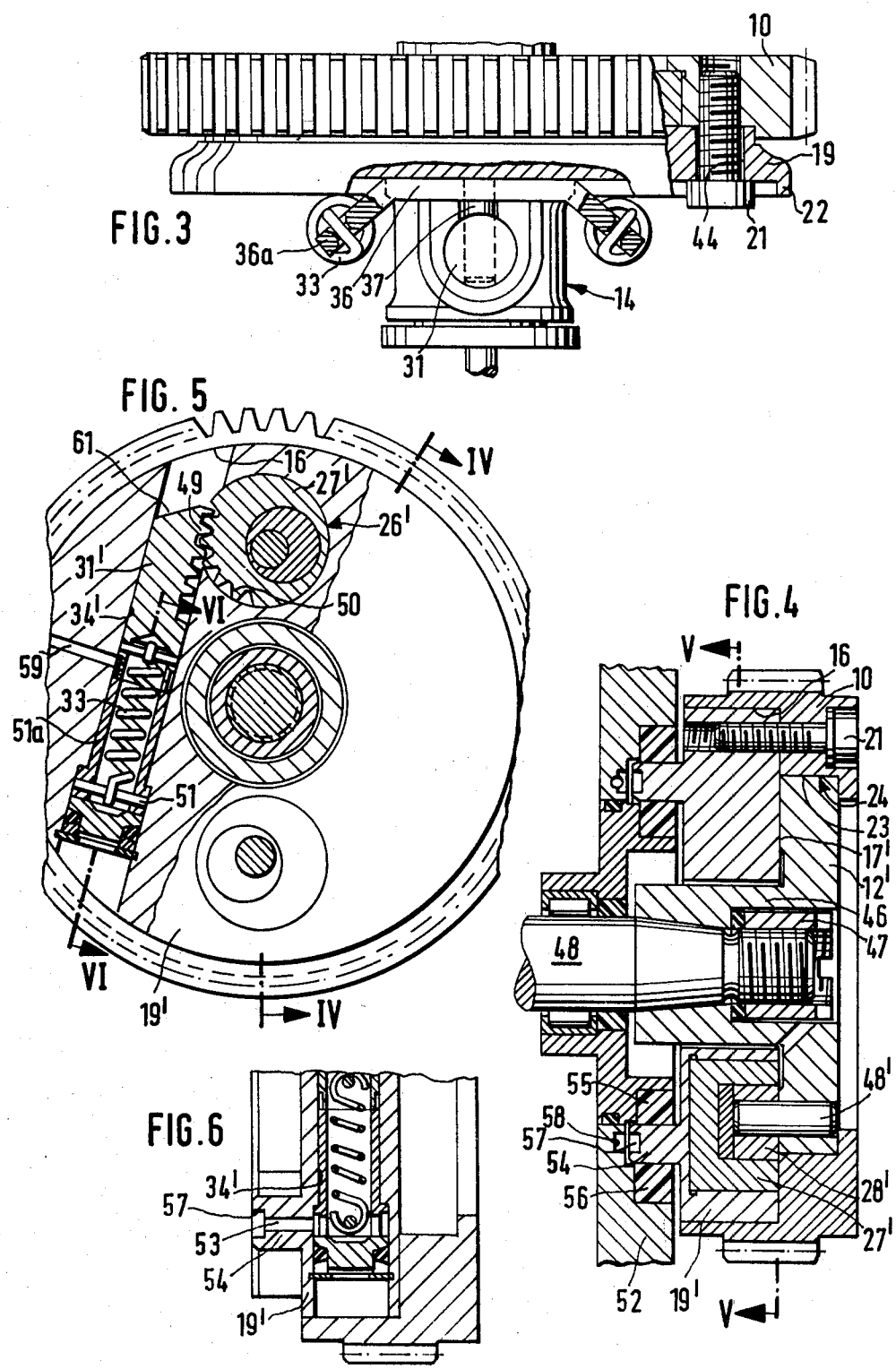

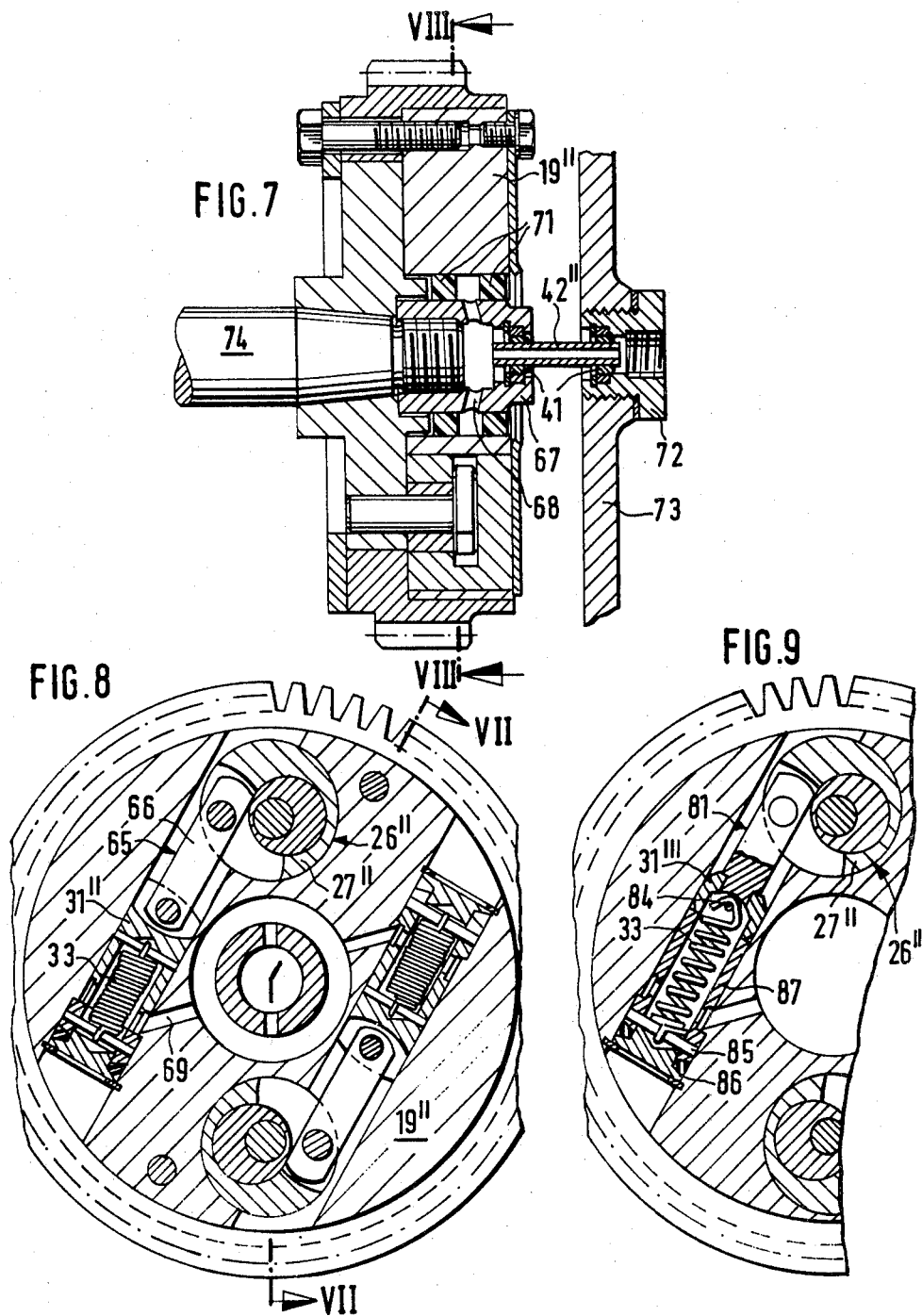

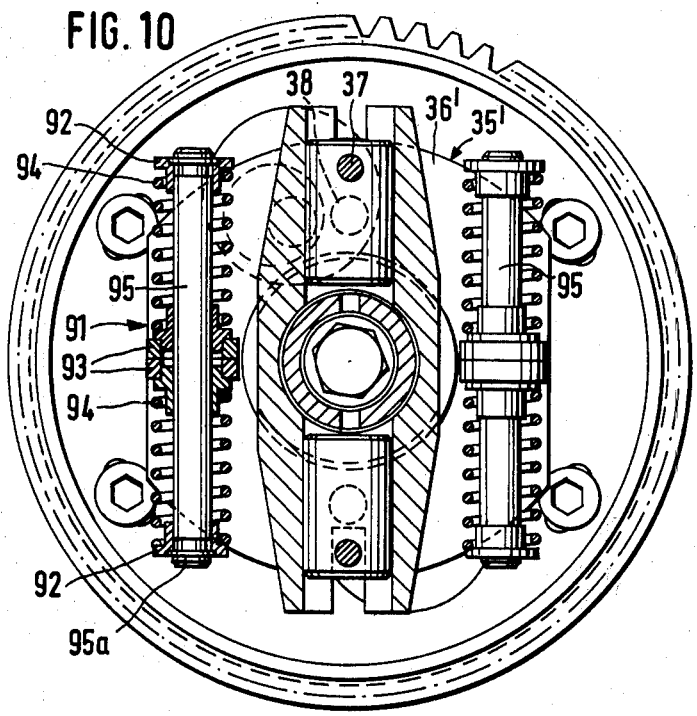

INJECTION TIMING DEVICE FOR INTERNAL COMBUSTION ENGINE

BACKGROUND OF THE INVENTION

The invention relates to a rotatable injection timing device for internal combustion engines and more particularly diesel engines provided with at least one servo piston, said device being operable by the pressure of a hydraulic medium, controlled at least in dependence on the speed, against a resetting force, said at least one servo piston adapted to vary the mutual rotary position of coaxially arranged input and output shaft members by means of an adjusting gear mechanism. Such an injection timing device has been known (Swiss Pat. No. 331,948) wherein the relative rotary position of the output shaft with respect to the input shaft can be varied by servo-actuated servo pistons accommodated within the timing device and arranged to be effective radially toward the outside. One of the servo pistons contains a control slide valve operated by centrifugal force and is effective against the bias of a resetting spring, this slide control valve being arranged to control the position of the servo piston. The transmission of the adjusting movements takes place via rocker arms resting on adjusting blocks connected to the output shaft, and the force-derived connection between the rocker arms and adjusting blocks is maintained by helical compression springs, in addition to the driving torque which also serves for this purpose. In this timing device, the instant of injection can be controlled exclusively in dependence on the speed, and the torque fluctuations caused by the cam drive mechanism of the injection pump can be damped only inadequately by the helical compression springs. These torque fluctuations lead, due to the direct path transmission of the adjusting gear system which includes the rocker arms, to rotational torsional vibrations and thus to short-term angular changes between the input and output sections; this results, in addition to creating a loud drive noise, also in an unintended, extensive load dependability of the adjusting operation. The above-described disadvantages furthermore lead to a rapid wear of the transmission parts and thus to a change in the injection timing, which cannot be tolerated, especially in case of modern engines due to the increased demands regarding the exhaust gas quality.

It is true that injection timing devices operated by centrifugal force are known from German Pat. No. 1,022,419 and British Pat. No. 816,498 wherein the flyweights engage the adjusting eccentrics of eccentric pairs constituted by adjusting and compensating eccentrics and serving as the adjusting gear system. On account of the self-locking action inherent in the construction of these injection timing devices, the latter show a low dependence on the load in case of load surges and consequently also exhibit a low wear sensitivity; besides, the noise produced by this system is low. However, these timing devices also can only be controlled in dependence on the speed, and they are limited in their operating capacity by the size of the flyweights and of the space available for installation of the resetting springs.

OBJECT AND SUMMARY OF THE INVENTION

The injection timing device of this invention has, in contrast to the above, the advantage that it is possible, by the combination of the eccentric pair which serves as the adjusting gear system with the servo piston coupled to the adjusting eccentric and operable by the pressure of the hydraulic medium, to provide an injection timing device which, with small outer dimensions, reveals an increased operating capacity, a low noise generation and load dependability, as well as a long service life. The control pressure of this timing device can be regulated or controlled outside of the timing device in a separate control unit, and thus can be adapted also in dependence on several operating parameters to the more sophisticated requirements to be met by modern engines.

By means of the features recited in the dependent claims, further advantageous developments and improvements of the injection timing device set forth in the main claim are possible.

Thus, in an injection timing device, the servo piston is conventionally housed in a piston carrier connected to the input shaft. An extremely short mode of construction can be achieved by using as the piston carrier a bearing member receiving a pair of eccentrics. An advantageous direct power transmission can be attained by arranging the servo piston and the pair of eccentrics in the same plane disposed perpendicularly to the longitudinal axis of the timing device with the bearing member, so that the transmission member can be arranged advantageously.

In a preferred embodiment of the injection timing device, the servo piston is housed in a cylinder bore of the piston carrier. In this way a well-proven component of the conventional centrifugal timer, which contains the pair of eccentrics, can be incorporated practically unchanged, and an orderly construction of the injection timing device results which can be easily mounted and adjusted. By means of suitable structure the mounting space lying in the same plane and beside the servo pistons can be optimally utilized, so that the springs can be made to be correspondingly strong while they can be readily mounted and adjusted at the same time.

It is possible to employ always the same, or a slightly modified, adjusting gear mechanism for a great variety of attachment and installation conditions and structural configurations of the timing device. With servo pistons housed in the bearing disk, the advantage is obtained that the adjusting gear mechanism can be easily machined.

A secure feeding of the hydraulic medium, practically unaffected by eccentricities, is attainable. In addition to the speed, still further operating parameters can be processed without having to make alterations in the structural size or structural configuration of the timing device.

The invention will be better understood as well as further objects and advantages thereof become more apparent from the ensuing detailed description of preferred embodiments taken in conjunction with the drawings.

BRIEF DESCRIPTION OF THE DRAWINGS

Five embodiments are illustrated in the drawings and will be explained in greater detail in the description below.

FIG. 3 shows a top plan view, partially in section, in the direction of arrow III in FIG. 2;

FIG. 4 is a longitudinal section along line IV—IV in FIG. 5 through the second embodiment of the invention;

FIG. 5 shows a cross sectional view along line V—V in FIG. 4;

FIG. 6 shows a fragmentary sectional view along line VI—VI in FIG. 5;

FIG. 7 shows a longitudinal sectional view along line VII—VII in FIG. 8 through the third embodiment of the invention;

FIG. 8 shows a cross sectional view along line VIII—VIII in FIG. 7;

FIG. 9 shows a partial cross section corresponding to FIG. 8, of the fourth embodiment of the invention, and FIG. 10 shows a cross sectional view corresponding to FIG. 2, of the fifth embodiment of the invention.

DESCRIPTION OF THE EMBODIMENTS

Figure 1:
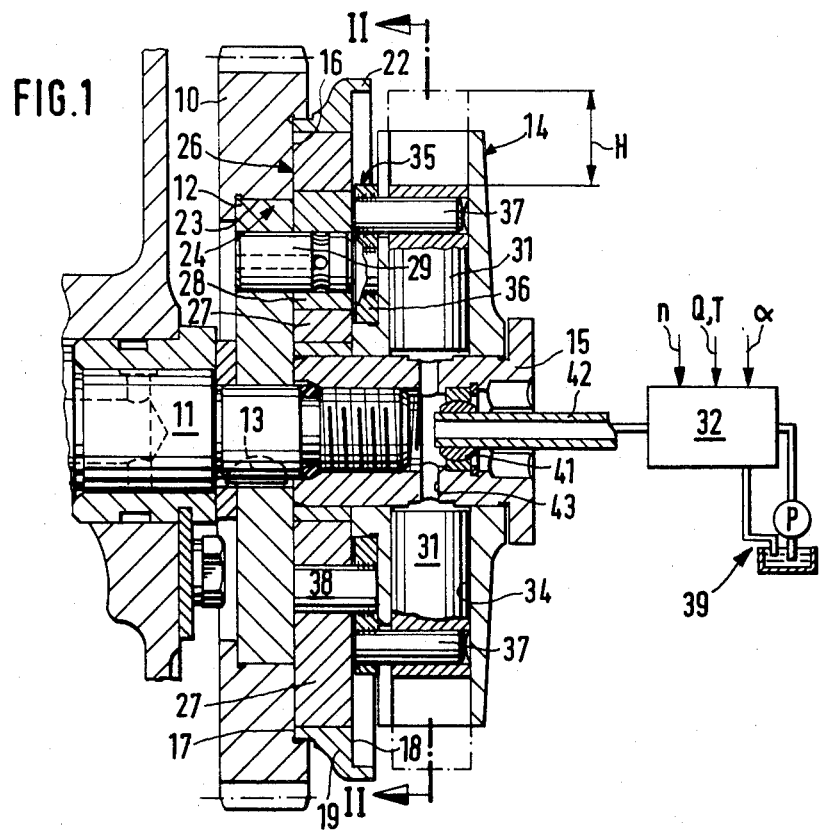
FIG. 1 is a longitudinal sectional view through the first embodiment of the invention.
Figure 2:
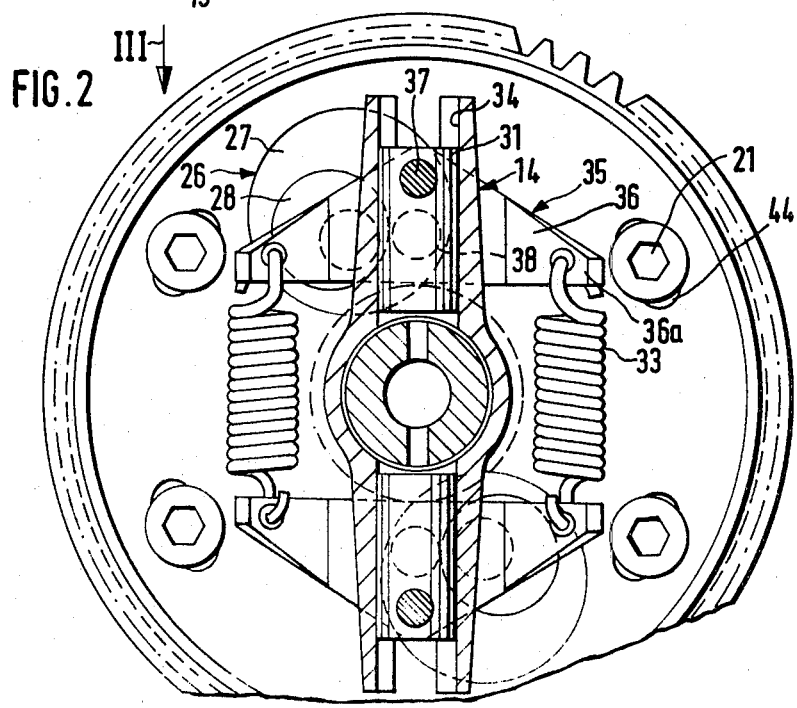
FIG. 2 shows a sectional view along line II—II in FIG. 1.

The injection timing device for a fuel injection pump for diesel engines, illustrated in FIGS. 1–3 as the first and preferred embodiment, is provided as an open installation injection timing device for mounting in a closed drive casing or the gearbox of the engine.

The injection timing device serves in a conventional way for changing, at least in dependence on the speed, the mutual rotary position of two equiaxial shafts, a driving shaft and a driven shaft, so that the driven shaft either is simultaneously the camshaft of the injection pump or a connecting shaft coupled therewith. Accordingly, by varying the rotary position of the two shafts the instant of injection of the fuel injection pump is varied in dependence on a predetermined interrelationship.

A drive gear wheel 10 is provided as the driving shaft and/or input shaft, and an intermediate shaft 11 is arranged as the output shaft, which latter is coupled, in a conventional manner not illustrated in detail, with the camshaft of the fuel injection pump. The injection timing device, of course, also can be mounted directly on the camshaft of the injection pump, as is the case in the embodiments described hereinafter. A bearing flange 12, secured against rotation by a disk spring 13, is attached on the intermediate shaft 11 by means of a ring nut 15 which simultaneously serves as a guide element for a piston carrier 14 and as the hub of the timing device.

An adjusting disk 19 provided with two planar-parallel end faces 17 and 18 is inserted in a bore 16 of the drive gear 10 and is fixedly connected to the drive gear 10 by means of screws 21 (see FIGS. 2 and 3). The adjusting disk 19 is provided, in the present embodiment, with a stop ring 22 which projects beyond the end face 18 and thus serves as the outer abutment. The function of this stop ring will be explained in greater detail later. A cavity 24 comprising an annular groove and formed by one end face 17 of the adjusting disk 19 and a recess 23 in the drive gear 10, receives the bearing flange 12 and thus forms an axial and radial bearing for the drive gear 10. The connection between the bearing flange 12, to be considered part of the driven shaft 11, and the drive gear 10, which serves as the driving shaft, is provided by two pairs of eccentrics 26-26 rotatably mounted in the adjusting disk 19, which latter serves as the bearing member. These pairs of eccentrics each comprise one adjusting eccentric 27 and a compensating eccentric 28. The compensating eccentrics 28 are connected by means of one pin 29 with the bearing flange 12 and serve for compensating for the arc height which would be reached by the centers of the adjusting eccentrics 27 if they were to revolve around the pins 29 without compensating eccentrics 28. The revolving motion is effected, according to the invention, by servo pistons denoted by 31 and operable by the pressure of a hydraulic medium; also these servo pistons are guided in an oil-tight manner in radially outwardly oriented cylinder bores 34 of the piston carrier 14 and move away from the ring nut 15 toward the outside in accordance with the pressure of the hydraulic medium controlled by a control device 32, against the force of resetting springs 33. During this step, the adjusting eccentrics 27 are rotated by transmission members 35 engaging eccentrically at the adjusting eccentrics 27.

The transmission members 35 comprise one intermediate member 36 which is arranged as a balance-beam-like transverse arm with the intermediate member 36 being provided in the center with two spaced-apart connecting bolts 37 and 38. The first connecting bolt 37 is fitted into the associated servo piston 31 and the second connecting bolt 38 is fitted into the corresponding adjusting eccentric 27. Thus, the longitudinal motion of the servo pistons 31, which takes place against the resetting force of the timing device and the resetting springs 33, is translated by a tensile force in the intermediate member 35 into the rotary motion of the adjusting eccentrics 27. Compensating movements can take place at the bearing of the piston carrier 14 as well as at the intermediate member present between the two bolts 37 and 38. The two tension springs 33, (FIG. 2) that are mounted into the outermost ends, denoted by 36a, of the intermediate members 36 and which serve as the resetting springs, act simultaneously for purposes of restoring and stabilizing. They affect the adjustment only conditionally, if the feed of hydraulic medium to the servo pistons 31 is controlled externally in the control unit 32. Such a control can take place, as indicated by the arrows at the control unit 32, in dependence on the speed n, the load Q, and/or an operating temperature T, and the actual value of the adjusting angle $\alpha$ which characterizes the instant of injection. The associated pressure source is only roughly indicated and denoted by 39. Instead of controlling the hydraulic medium fed to the servo pistons 31, it is also possible for the control unit 32 to regulate the pressure of the hydraulic medium in its level in correspondence with the operating parameters of the engine, and the servo pistons 31 then are displaced in accordance with the resetting force of the resetting springs 33 in proportion to the pressure, and consequently the adjusting eccentrics 27 are correspondingly rotated. The largest possible stroke H of the servo pistons 31 and thus the maximum adjustment of the rotary position of both shafts 10 and 11 with respect to each other is limited by the stop ring 22 which projects beyond the end face 18 of the adjusting disk 19. Thus, as shown in FIG. 1, in the outermost position, indicated in dot-dash lines, of the servo pistons 31, the intermediate member 35 abuts this stop ring.

The hydraulic medium is fed to the servo pistons 31 by way of a conduit 42 from the control device 32. The conduit is introduced into the timing device from the outside and is attached in the axial center of the timing device by means of a fluid-tight ball-and-socket joint 41. The ball-and-socket joint 41 is attached in the interior of the ring nut 15 and compensates for axial displacements between the conduit 42 and the injection timing device. The engine oil fed into the interior of the ring nut 15 and which serves as the hydraulic medium passes via transverse bores 43 in the ring nut 15 into the zones of the cylinder bores 34 constituting the pressure chambers for the servo pistons 31.

In the illustrated initial position the servo pistons 31 rest, under the bias force of the resetting springs 33, on the outer surface of the ring nut 15, so that the starting position of the drive gear 10, serving as the input shaft, with respect to the intermediate shaft 11, serving as the output shaft, is determined. This initial position can be adjusted in a conventional manner by slotted holes 44 provided in the gear 10 in the zone of the screws 21.

The second embodiment shown in FIGS. 4-6 differs from the first embodiment according to FIGS. 1-3 essentially by the servo pistons, here denoted by 31', which are accommodated within the adjusting disk 19'. Thus, the adjusting disk 19' provided as the bearing member for the eccentric pairs 26'-26' simultaneously serves as the piston carrier, making it possible to impart to the entire timing device a short compact structure. As explained earlier herein about the adjusting disk 19 of the first embodiment, the adjusting disk 19' is also detachably connected to the drive gear 10 by means of screws 21, and the cavity 24 which comprises an annular groove, formed between one end face 17' of the adjusting disk 19' and the recess 23 in the drive gear 10, her again serves as an axial and radial bearing for the bearing flange 12', which latter is integrally connected to a timing device hub 46 and is attached by means of a ring nut 47 on a camshaft 48 of an injection pump, not shown, this camshaft being arranged to serve as the output shaft or driven shaft.

The compensating eccentrics, denoted by 28', (See FIG. 4) of the eccentric pairs 26'-26' which serve as the adjusting gear system are connected via connecting pins 48' to the bearing flange 12' of the timing device hub 46. The adjusting eccentrics, denoted by 27'-27', are disposed within the adjusting disk 19' and can be rotated by the servo pistons 31' and as shown in FIG. 5 this piston has one face that comprises a rack and includes a plurality of teeth that cooperate with teeth on the eccentric 27', which functions as a pinion. Thus, this gear system comprises a series of straight teeth 49 which cooperate with a series of teeth provided as at 50 on the outer surface of the adjusting eccentric 27'. Accordingly the cooperation of these elements serves as the means for translating the longitudinal movement of the servo pistons 31' into a corresponding rotary movement of the adjusting eccentrics 27'-27'. The resetting springs 33, which are designed as tension springs as in the first embodiment, are arranged equiaxially to the servo pistons 31' within the cylinder bores 34' and are hung into spring abutments 51 attached to these cylinder bores 34'.

The feed of pressure oil to the servo pistons 31' is effected in the second embodiment from a mounting flange 52 of the injection pump through one oil bore 53 within an annular projection (FIGS. 4 and 6) of the adjusting disk 19' into the interior of the cylinder bore 34'. The annular projection 54 is sealed radially toward the inside as well as the outside by the sealing ring denoted 55 and 56. And, an annular groove denoted 57 and 58 in the ring-shaped projection 54 and in the attachment flange 52, are arranged to secure a continuous oil supply to the oil bores 53 (see FIG. 6). Numeral 59 denotes one oil backflow line per cylinder bore 34'; this line, in a manner not illustrated in detail, is open toward the interior of the injection timing device housing and permits a continuous throughflow of the lubricating oil fed to the cylinder bore 34', whereby upon appropriate control by a control unit, not explained herein in detail, and optionally timed solenoid valves, the position of the servo pistons 31' can be controlled when measuring the actual value of the injection timing adjustment. The illustrated starting position of the servo piston 31' is determined by a tubular extension or bushing 51a of the spring abutments 51, while the outermost adjustment position of the servo piston 31', not shown, is fixed by the abutment of the inclined surface, denoted by 61, against the servo piston 31' on the inner shell surface of the bore 16 of the drive gear 10.

The servo pistons 31' and eccentric pairs 26'-26' arranged in the same plane lying perpendicularly to the longitudinal axis of the timing device, within the adjusting disk 19', have the advantage, in addition to providing, by their arrangement, a short compact structure for the timing device, that no pitching moments are transmitted by the servo pistons 31' to the adjusting eccentrics 27', thus ensuring low friction and a reduced wear and tear.

The third embodiment shown in FIGS. 7 and 8 differs from the aforedescribed second embodiment essentially by the modified structure of the adjusting gear system within the bearing part her denoted by 19" and constituted by an adjusting disk. This adjusting gear system is likewise disposed in the same plane, perpendicularly to the longitudinal axis of the timing device, with the eccentric pairs 26"-26". A pivotable crank mechanism 65 serves as the transmission means between the servo piston 31" and the associated adjusting eccentric 27"-27". This pivotable crank mechanism 65 consists essentially of a hinged plate 66 articulated to the servo piston 31"-31" as well as to the adjusting eccentric 27"-27". The resetting springs 33-33 are mounted in a similar way as in the second embodiment, but the feed of the hydraulic medium takes plate in the axial center similarly to that shown in FIG. 1 of the first embodiment by way of a conduit 42", supported in two oil-pressure-tight ball-and-socket joints 41, (see FIG. 7) into the interior of a ring nut 67 that is appropriately sealed toward the outside in all directions. From the ring nut 67 the pressure oil passes via transverse bores 68 in the ring nut 67 and via radial bores 69 within the adjusting disk 19" (see FIG. 8) to the pressure side of the servo pistons 31". The transition from the ring nut 67 to the adjusting disk 19" is secured against oil leakage toward the outside by means of two radial packing ring 71. While one of the two ball-and-socket joints 41 of the conduit 42' is attached, as in the first embodiment in FIG. 1, within the ring nut 67, the other ball-and-socket joint 41 is fitted oil-tight within a connecting bushing 72 wherein the bushing 72, in turn, is threaded into a fixed housing part 73.

The fourth embodiment, shown only in a fragmentary view in FIG. 9, corresponds to the embodiment of FIGS. 7 and 8, except for a modified construction of the servo piston, denoted by 31'" and the associated pivotable crank mechanism 81. The servo piston 31'" has a spherical sliding surface 82 and is fixedly connected to a push rod 83 articulated, just as the hinged plate 66 in the third embodiment (FIG. 8) movably to the adjusting eccentric 27"-27" of the eccentric pair 26"-26". The resetting spring 33 is suspended, in addition to being hung into a pin 84 in the servo piston 31'", on a second pin 85 within a spring abutment 86. The spring abutment 86 has a tubular extension or bushing 87 which surrounds the resetting spring 33 and simultaneously serves to determine the starting position of the servo piston 31'''-31''' shown in FIG. 9.

The fifth embodiment shown in FIG. 10 differs from the first embodiment illustrated in FIGS. 1–3 merely by a modified construction of the resetting springs, here denoted by 91, which consist, in contrast to the tension springs 33 in FIG. 2, of one set of compression springs 94 clamped between spring abutments 92 and 93. The spring abutments 92 are arranged as spring supporting plates and are each attached to the ends 95a of a stay bolt 95 which hold together the entire resetting spring unit 91. Also, it will be seen that the spring abutments 93 are formed by the ends, bent at a right angle and perforated, of two intermediate members 36', arranged as crossarms, of the transmission members denoted by 35'. Although the spring arrangement shown in FIG. 10 is more expensive than the resetting springs 33, the former has the advantage of an improved adjusting possibility and a more accurate tolerance characteristic of the spring dimensions.

The mode of operation of the injection timing device of this invention will now be described in a coherent disclosure with reference to the first embodiment shown in FIGS. 1–3.

In the initial position of the servo pistons 31 shown in FIGS. 1–3, the drive gear 10, which serves as the input shaft, assumes a predetermined rotary position with respect to the intermediate shaft 11 which serves as the output shaft and is provided with the bearing flange 12. If, upon an increase in the speed, an advancement of the instant of injection is desired, then the associated adjustment is preprogrammed in the control unit 32 and the pressure of the hydraulic medium conveyed by the pressure source 39 is conducted, under the control of the control unit 32, via the conduit 42 to an area beneath the servo pistons 31, and adjusts the latter radially toward the outside, namely for such a period of time until, upon a corresponding rotation of the adjusting eccentrics 27-27, the bearing flange 12 and thus the intermediate shaft 11 have been rotated with respect to the drive gear 10 by the desired adjusting angle α. The control fluid conducted to the area beneath the servo pistons 31 is controlled, with measurement of the actual value of the adjusting angle α, until the desired value and the actual value are identical.

However, it is also possible to directly control the pressure of the hydraulic medium fed via conduit 42 in dependence on the speed n and additional operating parameters, such as the load Q and operating temperatures T, and to vary this pressure counteract and thereby the resetting force of the resetting springs 33. In this case, the servo pistons 31 assume a position, at the instant when no load is exerted, i.e., at a change of direction of the force of the tongue surges, which is determined by the equilibrium between the pressure acting on the pistons 31 and the resetting force of the resetting springs 33. In this connection, the adjusting eccentrics 27 were rotated by a given amount which corresponds to the desired relative rotation of the drive gear with respect to the intermediate shaft 11.

Except for a different type of oil supply and force transmission between the servo pistons and the adjusting eccentrics, the embodiments shown in FIGS. 4–9 operate according to the same operating principle, and the fifth embodiment of FIG. 10 differs from the first embodiment illustrated in FIGS. 1–3 only by the different structure of the resetting springs; the mode of operation is exactly the same as that described in connection with FIGS. 1–3.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A rotatable injection timing device for internal combustion engines, especially for diesel engines, said timing device including coaxially arranged input and output shaft members, and provided with at least one servo piston, said timing device being exclusively operable by the pressure of a hydraulic medium against a resetting force, means for controlling said hydraulic medium in dependence on the speed of said engine, a piston carrier, said piston carrier including a pair of cylinder bores, wherein one each of a pair of servo pistons are disposed in said cylinder bores of said piston carrier, said piston carrier associated with a pair of intermediate members, an adjusting gear mechanism, said servo pistons adapted to vary the mutual rotary position of said coaxially arranged input and output shaft members by means of said adjusting gear mechanism, said adjusting gear mechanism including a pair of adjusting and compensating eccentrics, said pair of eccentrics each being mounted in a bearing member associated with at least one of said shaft members, said intermediate members associated with said eccentrics, and spring means connecting said intermediate members, a transmission member for coupling said servo pistons to said adjusting eccentrics and said adjusting eccentrics being exclusively rotatable by positional changes of said servo pistons effected by the hydraulic medium.

2. A rotatable injection timing device according to claim 1, further including a guide member associated with said output shaft, said piston carrier further being supported for rotary movement, separately from said bearing member for the eccentric pair, on said guide member associated with said output shaft.

3. A rotatable injection timing device according to claim 2, further wherein said transmission member serving as a coupling means between said servo pistons and the adjusting eccentric is provided with a first connecting bolt arranged parallel to the longitudinal axis of said timing device.

4. A rotatable injection timing device according to claim 8, further wherein said first connecting bolt is inserted in said servo pistons at right angles to the longitudinal axis thereof, and said first bolt is further connected via an intermediate member to a second connecting bolt which extends into said adjusting eccentric.

5. A rotatable injection timing device according to claim 1, further wherein said bearing member comprises an adjusting disk and is detachably joined to said input shaft.

6. A rotatable injection timing device according to claim 1, further wherein said hydraulic medium is fed to said at least one servo piston through a conduit mounted in the axial center of said output shaft.

7. A rotatable injection timing device according to claim 12, further wherein said conduit terminates in said timing device by means of a liquid-tight ball-and-socket joint.

8. A rotatable injection timing device according to claim 1, further wherein said hydraulic medium is fed to the said at least one servo piston at a pressure depending on the speed (n), on further operating parameters (e.g. Q, T) of the engine, and is determinable by a control unit arranged outside of said timing device.

9. A rotatable injection timing device for internal combustion engines, especially for diesel engines, said timing device including coaxially arranged input and output shaft members, and provided with at least one servo piston, said timing device being exclusively operable by the pressure of a hydraulic medium against a resetting force, means for controlling said hydraulic medium in dependence on the speed of said engine, an adjusting gear mechanism, said at least one servo piston adapted to vary the mutual rotary position of said coaxially arranged input and output shaft members by means of said adjusting gear mechanism, said adjusting gear mechanism including a pair of adjusting and compensating eccentrics, said pair of eccentrics each being mounted in a bearing member associated with at least one of said shaft members, a piston carrier including a cylinder bore, wherein said at least one servo piston is disposed in said cylinder bore of said piston carrier, a guide member associated with said output shaft, said piston carrier being further supported for rotary movement separately from said bearing member for the eccentric pair on said guide member associated with said output shaft, a transmission member for coupling said at least one servo piston to said adjusting eccentrics and said adjusting eccentrics being exclusively rotatable by positional changes of said at least one servo piston effected by the hydraulic medium, said transmission member serving as a coupling means between said at least one servo piston and the adjusting eccentric is provided with a first connecting bolt arranged parallel to the longitudinal axis of said timing device, wherein said first connecting bolt is inserted in the said at least one servo piston at right angles to the longitudinal axis thereof, and said first bolt is further connected via an intermediate member to a second connecting bolt which extends into said adjusting eccentric.

10. A rotatable injection timing device according to claim 2, further wherein said transmission member serving as a coupling means between said at least one servo piston and the adjusting eccentric is provided with a first connecting bolt arranged in parallel to the longitudinal axis of said timing device.

* * * * *